(12) United States Patent
Jacobs

(10) Patent No.: US 7,757,996 B2
(45) Date of Patent: Jul. 20, 2010

(54) BREAKABLE HANGERS

(75) Inventor: William Jacobs, Sylvester, WV (US)

(73) Assignee: Boone Supply Company, Sylvester, WV (US)

( * ) Notice: Subject to any disclaimer, the term of this patent is extended or adjusted under 35 U.S.C. 154(b) by 112 days.

(21) Appl. No.: 11/026,593

(22) Filed: Dec. 30, 2004

(65) Prior Publication Data

US 2005/0087662 A1    Apr. 28, 2005

Related U.S. Application Data

(60) Provisional application No. 60/623,305, filed on Oct. 29, 2004.

(51) Int. Cl.
*E21F 17/02* (2006.01)
*F16L 3/00* (2006.01)

(52) U.S. Cl. .................. 248/64; 248/302; 248/303; 248/304; 248/339; 248/58

(58) Field of Classification Search ............. 248/302, 248/303, 304, 339; 405/184.4
See application file for complete search history.

(56) References Cited

U.S. PATENT DOCUMENTS

| | | | | |
|---|---|---|---|---|
| 182,265 | A * | 9/1876 | Barker | 248/339 |
| 1,404,807 | A * | 1/1922 | Tait | 248/304 |
| 1,682,855 | A * | 9/1928 | Rose | 248/213.3 |
| 1,907,529 | A * | 5/1933 | Faure-Roux | 244/131 |
| 2,100,306 | A * | 11/1937 | McCarthy | 313/278 |
| 2,145,766 | A * | 1/1939 | Jung | 428/582 |
| 2,475,442 | A * | 7/1949 | Baum | 223/95 |
| 2,479,115 | A * | 8/1949 | Inman | 248/316.7 |
| 2,503,108 | A * | 4/1950 | Glandville | 248/211 |
| 2,522,658 | A * | 9/1950 | Williams | 248/211 |
| 2,565,978 | A * | 8/1951 | Meriwether | 248/327 |
| 2,624,201 | A * | 1/1953 | Thomson | 73/864.51 |
| 2,710,489 | A * | 6/1955 | Myers, Jr. | 40/322 |
| 2,842,822 | A * | 7/1958 | Bennett | 24/370 |
| 2,891,752 | A * | 6/1959 | Genter | 248/71 |
| 2,957,667 | A * | 10/1960 | Kughler | 248/339 |
| 3,424,422 | A * | 1/1969 | Klangos | 248/561 |
| 3,488,025 | A * | 1/1970 | Rowland | 248/339 |
| 3,692,269 | A * | 9/1972 | Hales | 248/691 |
| 3,718,947 | A * | 3/1973 | Huber | 24/298 |
| 3,820,195 | A * | 6/1974 | Hutzell | 452/187 |
| 3,972,499 | A * | 8/1976 | Simmons | 248/225.21 |

(Continued)

FOREIGN PATENT DOCUMENTS

GB    2248284 A  *  4/1992

OTHER PUBLICATIONS

Jackburn MFG., Inc, Wire Forming and Fabrication—Steel Stove Grates (1 page document).

(Continued)

*Primary Examiner*—J. Allen Shriver, II
*Assistant Examiner*—Michael McDuffie
(74) *Attorney, Agent, or Firm*—David G. Oberdick

(57) ABSTRACT

The present invention comprises a collapsible hanger and a method for using the same for supporting, among other things, cables from the ceiling of mines. The collapsible hangers of the present invention allow the cables to fall to the floor when tension, pressure, and/or weight is applied to the hangers, either directly or indirectly.

54 Claims, 13 Drawing Sheets

U.S. PATENT DOCUMENTS

| | | | | |
|---|---|---|---|---|
| 4,123,900 | A | * | 11/1978 | Sadowski ........................ 59/83 |
| 4,195,192 | A | * | 3/1980 | Hackney et al. ............ 174/40 R |
| D275,527 | S | * | 9/1984 | Gee ............................ D3/215 |
| 4,646,396 | A | * | 3/1987 | Geese ........................ 24/598.7 |
| 4,667,782 | A | * | 5/1987 | Toase et al. ................ 191/12 R |
| 4,887,785 | A | * | 12/1989 | Blaich ......................... 248/339 |
| 4,957,259 | A | * | 9/1990 | Wolf, Jr. ...................... 248/304 |
| 5,174,536 | A | * | 12/1992 | Pelletier et al. ............. 248/339 |
| 5,553,823 | A | * | 9/1996 | Protz, Jr. ..................... 248/304 |
| 5,575,446 | A | * | 11/1996 | Swenson et al. ............ 248/304 |
| 5,779,198 | A | * | 7/1998 | Rutherford et al. ............ 248/58 |
| 5,816,558 | A | * | 10/1998 | Sommer et al. ............. 248/544 |
| 5,871,193 | A | * | 2/1999 | Jacobs et al. ................ 248/317 |
| 6,036,153 | A | * | 3/2000 | Rose et al. .................. 248/339 |
| 6,155,526 | A | * | 12/2000 | Brown ........................ 248/303 |
| 6,254,050 | B1 | * | 7/2001 | Albrecht et al. ............. 248/303 |
| 6,270,048 | B1 | * | 8/2001 | Carlson ....................... 248/339 |
| 6,302,365 | B1 | * | 10/2001 | Catanzarite et al. ......... 248/339 |
| 6,575,416 | B1 | * | 6/2003 | Avinger ....................... 248/307 |

OTHER PUBLICATIONS

"S" Hooks, Phone Woodstream for quantity "S" Hook Prices (2 page document).

J.H. Fletcher & Co., Fletcher, MRS: Mobile Roof Support, Mobile Roof Supports for Coal Pilar Extraction, May 2003, Huntingtown, WV, USA (4 page pamphlet).

Cambria County Associate for the Blind and Handicapped, CAB Hooks, Hangers Cable Supports and Safety Products, May 2002, Ebensburg, PA, USA (16 pages & 2 page insert).

Coal People, A Publication Dedicated to Coal People, Coal Technology, Aug. 2002, vol. 25 No. 11, Charleston, WV, USA (36 page magazine).

* cited by examiner

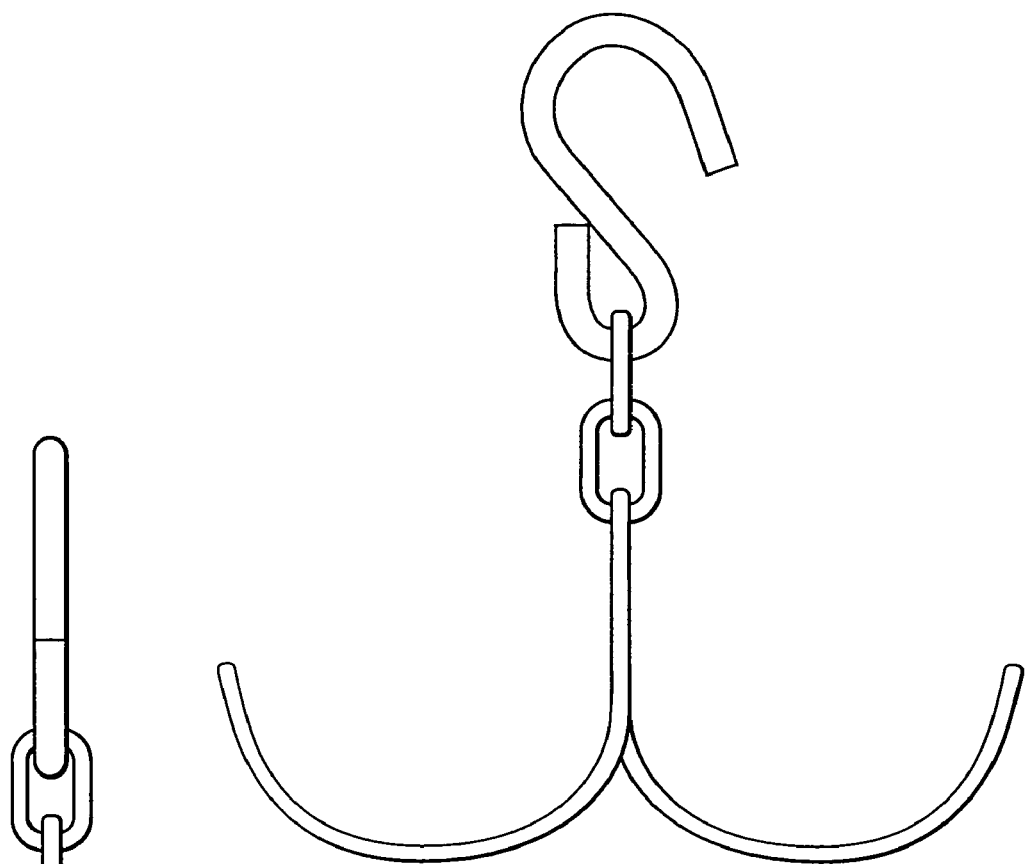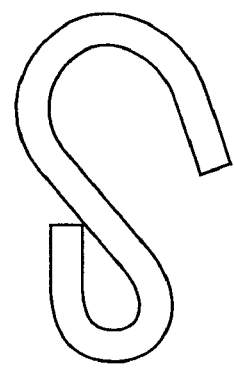
FIG. 12A
FIG. 12B
FIG. 12C

US 7,757,996 B2

BREAKABLE HANGERS

This patent application claims priority from the United States provisional patent application of the same title, which was filed on Oct. 29, 2004 and was assigned U.S. patent application No. 60/623,305.

BACKGROUND OF THE INVENTION

Generally, in mining, miners must install and remove hangers from the ceiling of the mines. These hangers support various types of cables and wires, electrical and otherwise, etc. Often these hangers and cables are installed and removed by hand. Historically, to remove the cables, miners walked beneath the hangers and removed the cable from each hanger, or removed the cable and the hanger from the ceiling of the mine. All of this is and has been done by hand.

A Mobile Roof Support ("MRS") is a machine used to perform full pillar extraction methods in underground coalmines. The use of MRS's eliminates the setting of roadway, turn, and breaker posts that are required during pillar recovery operations. These machines provide more effective ground control than timbers, and their usage enhances the safety of persons in the mines and reduces material handling injuries. MRS's are shield-type hydraulic support units mounted on crawler tracks and remotely controlled.

Many MRS's are equipped to retract cable and to wind up the cable. Often, though, even when minors are working with MRS's, the miners need to release the cable from the hangers by hand before the MRS can wind the cable. A need exists for miners working MRS's to be able to remove the cable from the roof supports or hangers while avoiding danger to miners working in the area of the so-called Red Zone Pillar Line (the "Red Zone") in a mine.

The Red Zone is where the pillars of coal are being extracted. Miners are encumbered and endangered in their work by having to enter the Red Zone in order to retrieve the cable from the hangers. They are endangered by the possibility of the roof falling on top of them. A collapsible hanger, such as that shown by the present invention, would release the cable safely from the roof without miners having to enter the Red Zone to get the cable out of the hangers by hand. A collapsible roof hanger satisfies this need by allowing the cable to fall to the ground when tension and/or weight is put on the hanger, such as when the cable is retracted. Depending upon the embodiment of the hanger, it may or may not stay in the roof plate after the cable is released. In a preferred embodiment of the present invention, the hanger stays in the roof plate after releasing the cable. Additionally, the present invention collapsible hanger may be made in a variety of ways, which allow it to be produced and to sell at a low or reasonable cost. The low cost permits miners to leave the hangers in the mine instead of having to recover them to use for new mining projects and areas.

BRIEF SUMMARY OF THE INVENTION

One embodiment of the present invention comprises a collapsible hanger for use in mining having an upper hook, at least one lower hook, and a connecting member, which connects the upper hook to the at least one lower hook, wherein the at least one lower hook is constructed such that when tension is applied to a cable supported by the at least one lower hook, the hanger releases the cable.

Another embodiment of the present invention comprises a method of working with cables in a mine including installing a collapsible hanger in the mine roof. The collapsible hanger is comprised of an upper hook, at least one lower hook, and a connecting member, which connects the upper hook to the at least one lower hook, wherein the at least one lower hook is constructed such that when tension is applied to a cable supported by the at least one lower hook, the hanger releases the cable. This embodiment of the present invention also includes releasing the cable from the hanger by applying tension to the cable.

Other embodiments of the present invention may include the steps of winding up the released cable and/or leaving the hangers in the ceiling of the mine after the cable is released.

BRIEF DESCRIPTION OF THE DRAWINGS

For the present invention to be easily understood and readily practiced, the invention will now be described, for the purposes of illustration and not limitation, in conjunction with the following figures, wherein:

FIGS. 11 and 12 illustrate two additional embodiments of the present invention.

DESCRIPTION OF THE INVENTION

Figure 1:
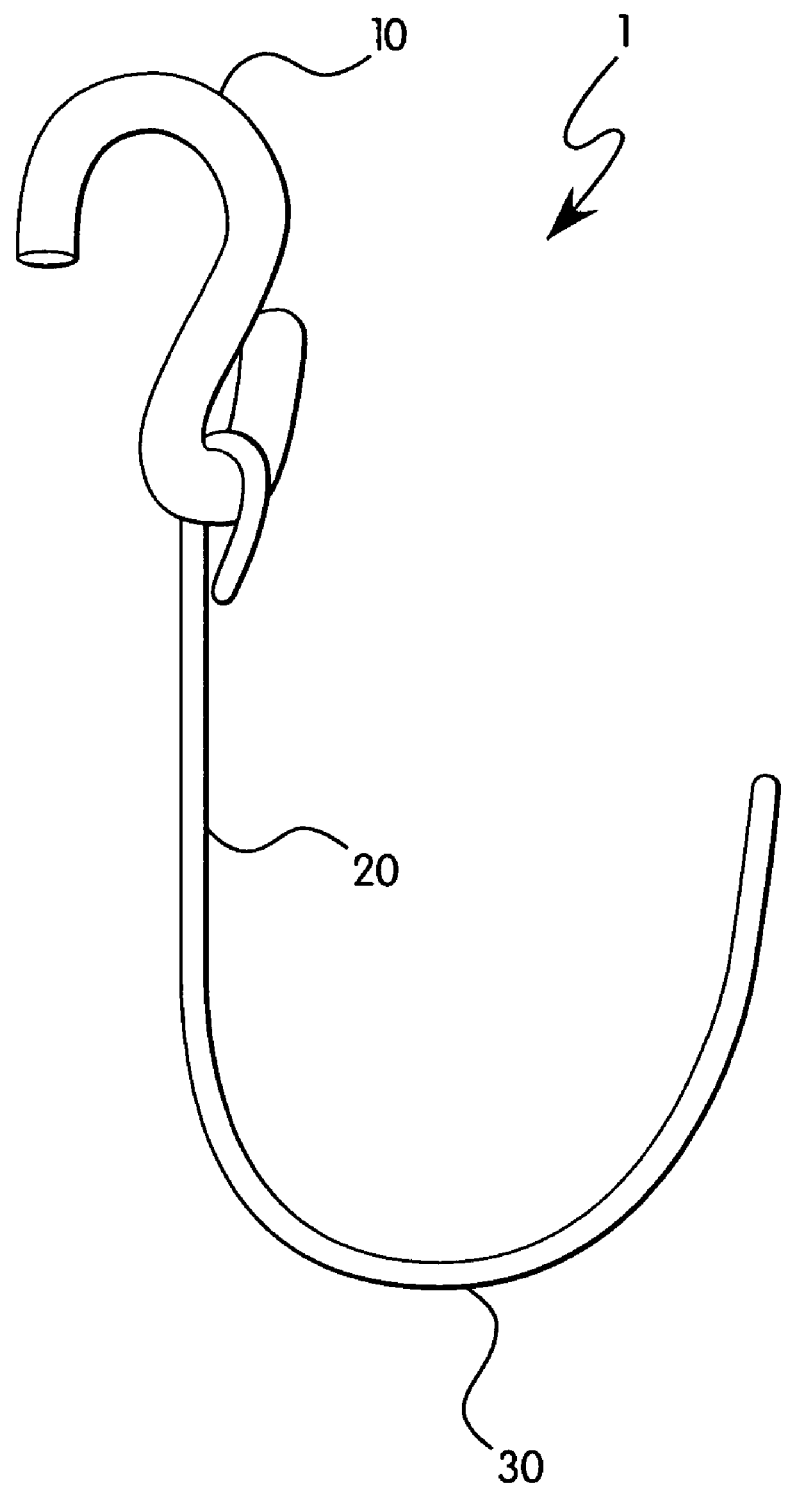
FIG. 1 illustrates one embodiment of the present invention collapsible hanger having a single lower hook.
Figure 2:
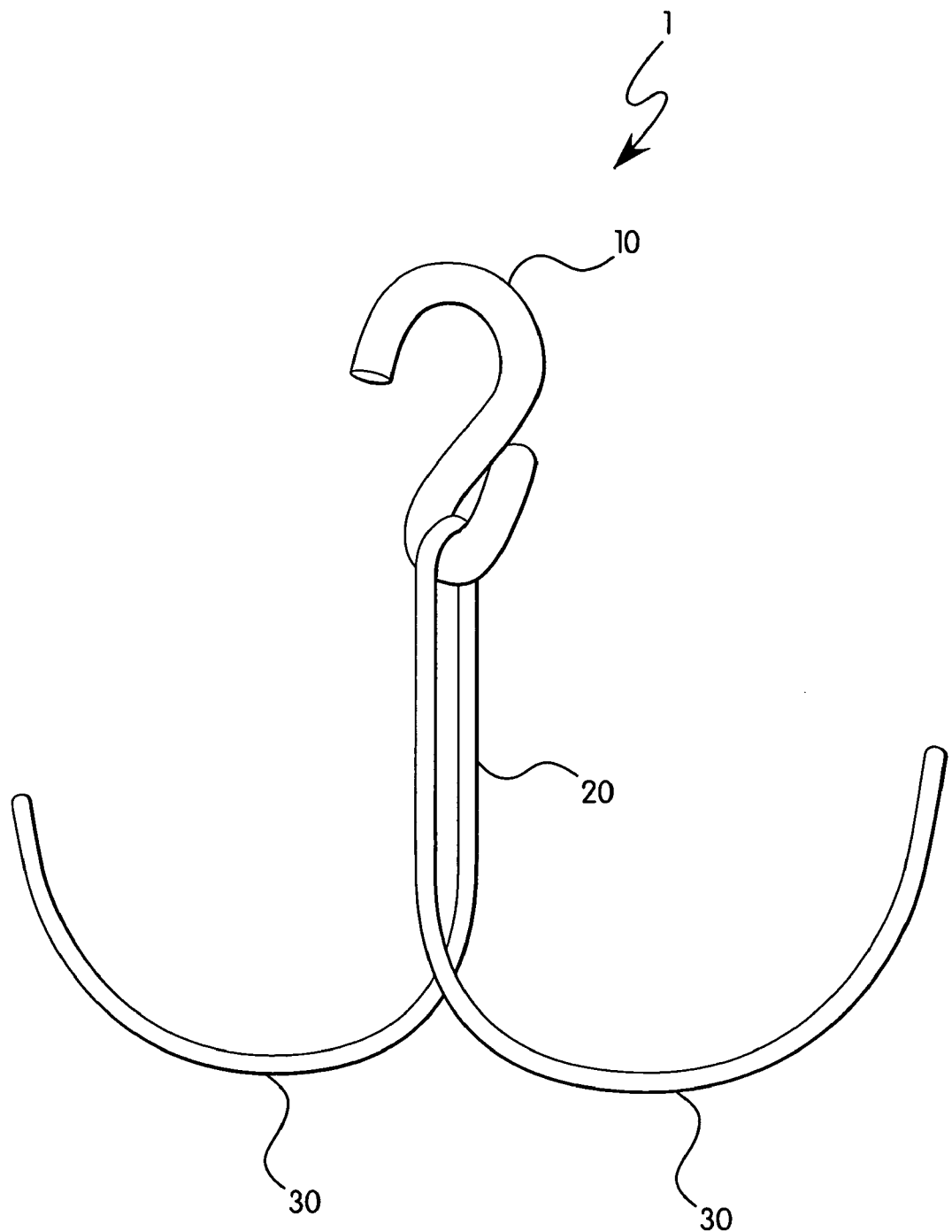
FIG. 2 illustrates another embodiment of the present invention having two lower hooks.
Figure 3:
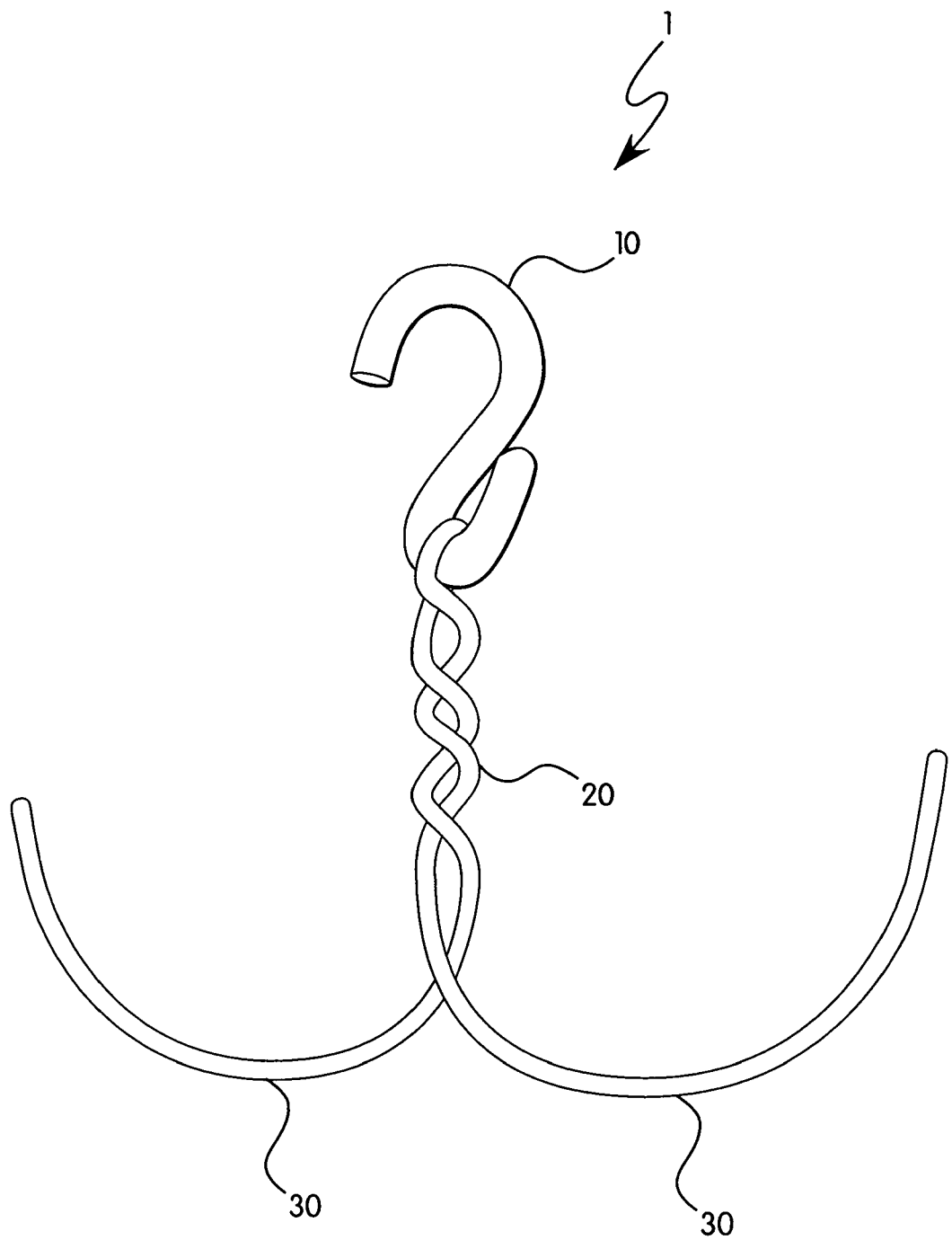
FIG. 3 illustrates a third embodiment of the present invention.

One preferred embodiment of the present invention provides for a collapsible hanger (1) that uses the ability of wire to bend under pressure to release a cable (50) from the hanger (1) without miners having to place themselves near the hanger and/or in harm's way. FIGS. 1 through 3 illustrate three embodiments of collapsible hangers (1) according to the present invention. The upper hook (10) hooks into or through the hole of a roof plate or the roof of the mine.

Figure 4:
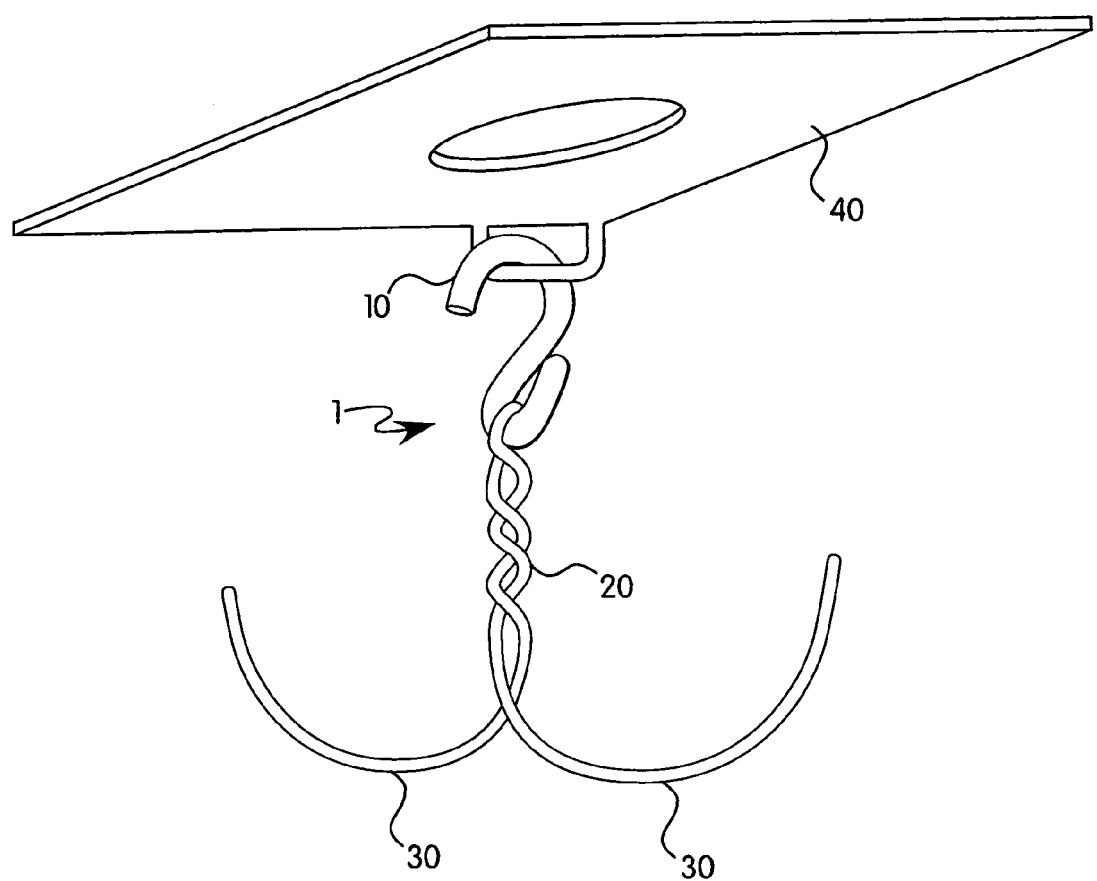
FIG. 4 shows one embodiment of the present invention hanger hanging from a roof plate.

The words "roof" and "ceiling" are used interchangeably herein. Essentially, the upper hook (10) of a collapsible hanger (1) hangs on or in the roof plate or ceiling of a mine. The hanger (1) can hook directly into the roof or ceiling of the mine or it can hang from another apparatus, which is secured to the mine roof or ceiling. Often times, as shown in FIG. 4, a roof plate (40) is secured to the mine ceiling. These roof plates (40) are designed so that a hanger (1) can connect to them (40) and hang from them. For the purposes of this invention, it is anticipated that the collapsible hanger (1) will be able to hang from the ceiling of a mine, but whether the hanger (1) connects to the ceiling directly, or to a roof plate (40), or to some other apparatus secured to the mine ceiling is not relevant so long as whatever means of connection that is used does not interfere with the essential functioning of the hanger (1).

Similarly, the word "cable" (50) is used herein to refer to cables, wires, chains, rope, or any cargo that may be supported by the hanger (1). A cable is one type of cargo that is often support by such hangers (1), but it is not meant to be the sole and exclusive type of cargo (50) used with the hangers (1) of the present invention. It will be obvious to one skilled in the art that any type of cargo that can be supported by the hangers (1) may benefit from the present invention. As such, the word "cable" should not be read to limit this invention.

Figure 5:
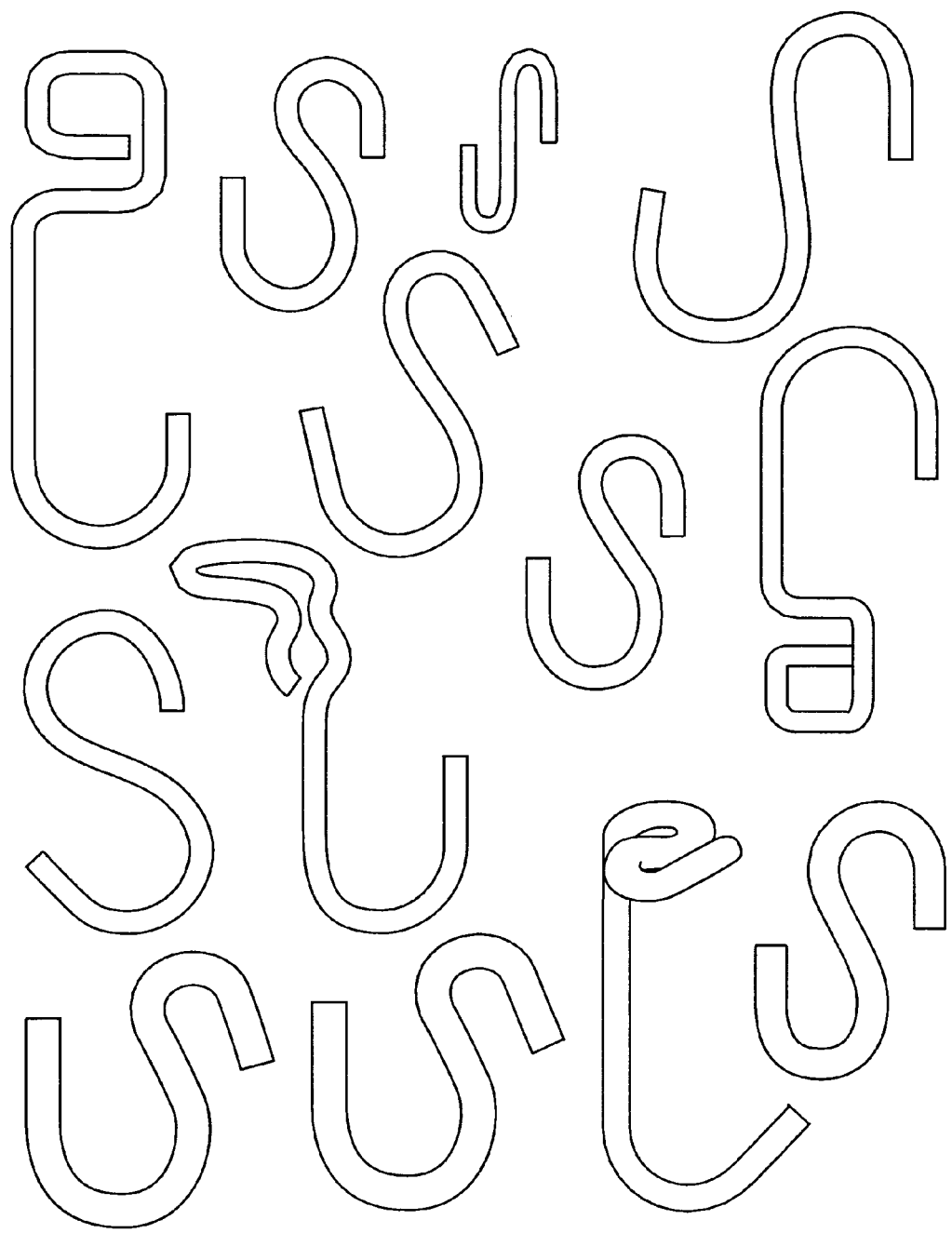
FIGS. 5 and 6 show possible shapes for the upper hook.
Figure 6:
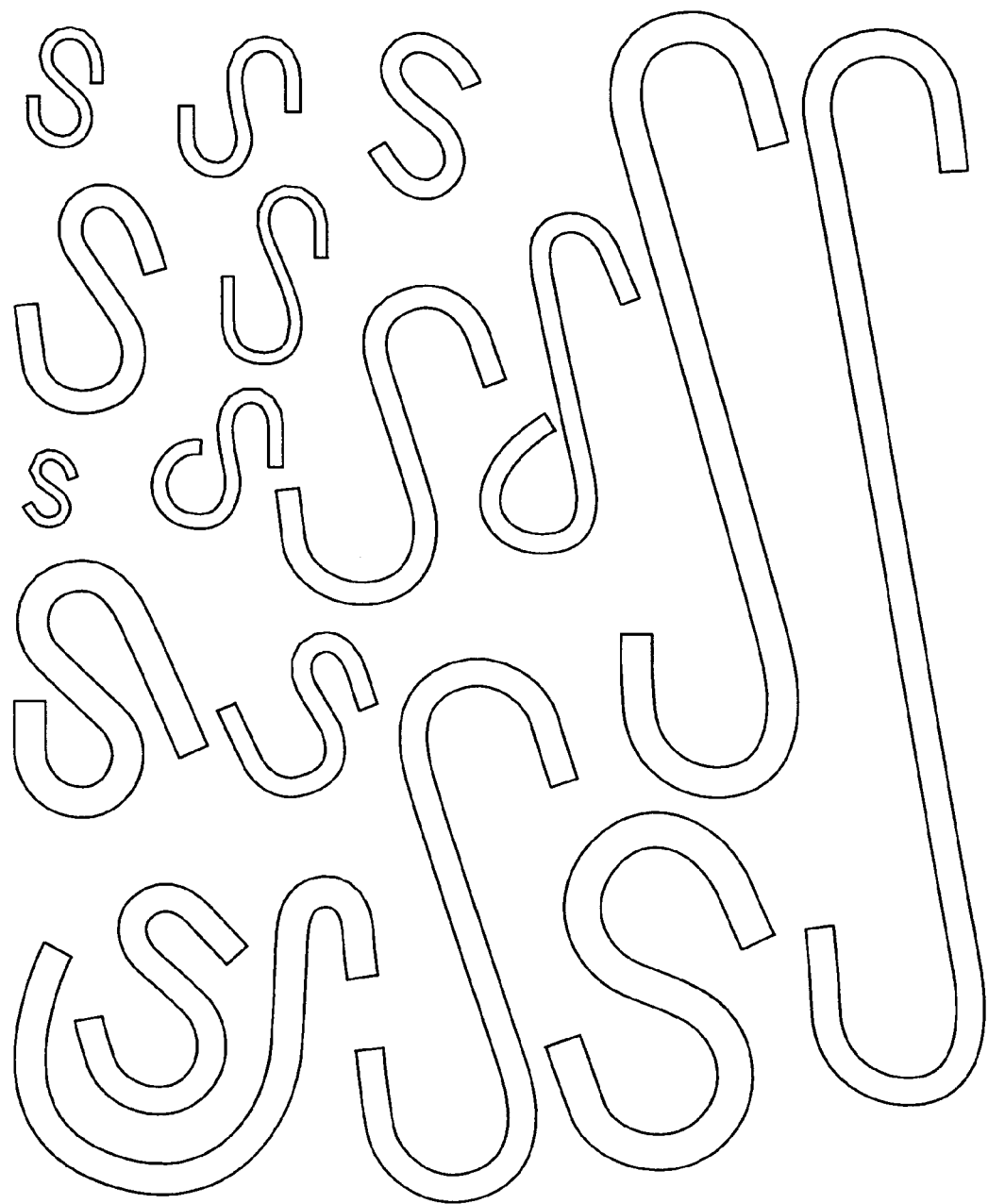

In one preferred embodiment of the present invention, shown in FIGS. 1 through 3, the upper hook (10) connects to the connecting member (20), which connects to one or more lower hooks (30). The upper hook (10) may be of any size and shape that securely connects to the mine ceiling and can support the weight of the connecting member (20), the lower hook(s) (30), and whatever cargo the lower hook(s) (30) is supporting. The upper hook (10) may be any of the "S" hooks illustrated in FIGS. 5 and 6, any hook-like shape, or it may not even be a hook shape but some other shape altogether. The upper hook (10) needs only to be designed to satisfy the secure connection and support requirements previously discussed. In a preferred embodiment of the present invention, the upper hook (10) is made from 0.207 to 0.250 inch gauge wire. In practice, 0.250-inch gauge wire performs the best. These figures should not be seen as limiting the scope of this invention, but as illustrating what has performed the best in experiments thus far.

The connecting member (20) connects the upper hook (10) to at least one lower hook (30). The connecting member (20) can be any size, shape, or material that is sufficiently strong to securely connect the lower hook(s) (30) to the upper hook (10) and to support the lower hook's (30) cargo. In a preferred embodiment of the present invention, the connecting member (20) is of a similar gauge wire diameter, which changes size as it is cut to form the lower hook(s) (30) into a smaller gauge of wire. In a preferred embodiment of the present invention, the diameter of the metal wire connecting member (20) is 0.125 inches. Additionally, in a preferred embodiment of the present invention, the connecting member (20) remains securely connected to the lower hooks (30) and the upper hook (10) when tension is applied to the cable (50).

Figure 7A:
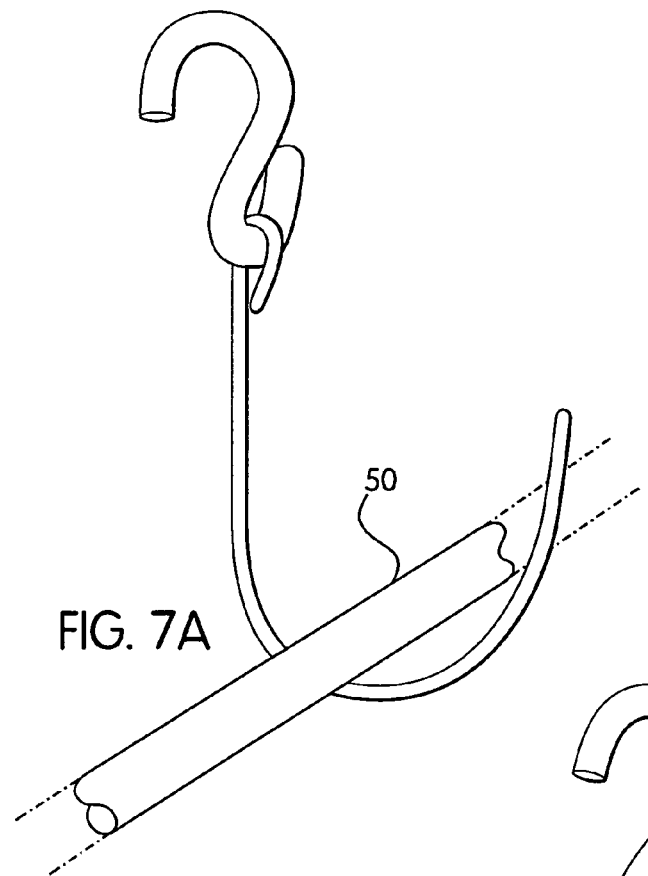
FIG. 7 shows two embodiments of the present invention hanger supporting cable(s)
Figure 7B:
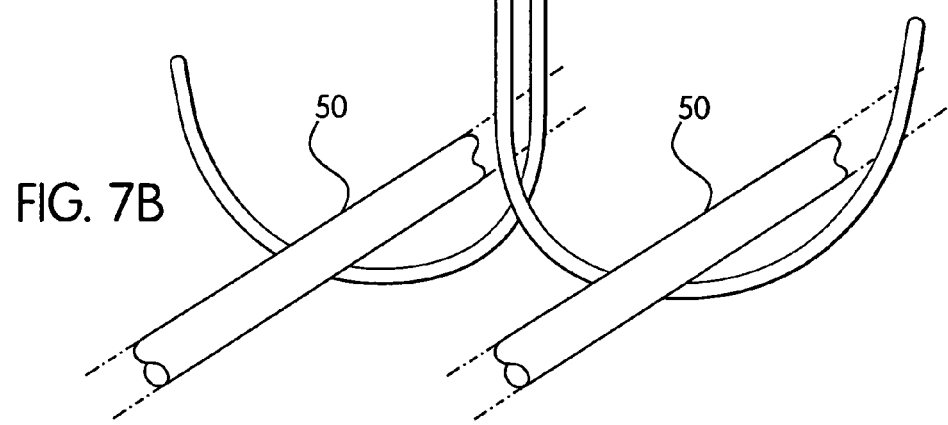

At least one lower hook (30) connects to the connecting member (20). FIGS. 1 and 2 illustrate two embodiments of the present invention having one and two lower hooks (30), but the present invention could have more than two lower hooks (30). The lower hook(s) (30) may be made of any material and may be any size and shape so long as it: (i) supports its intended cargo, (ii) stays attached to the connecting member (20) (for those embodiments that require this element), and (iii) does not release its cargo unless and until tension or additional weight is imparted to the lower hooks (30) and/or the cargo (50). The lower hook(s) (30) do not have to be a hook shape so long as they satisfy the above-identified criteria. In a preferred embodiment of the present invention, the lower hook(s) (30) is sized to be the same diameter or a lower diameter as the connecting member (20), thus, enabling the lower hook(s) (30) to bend or break when tension is applied to it. In a further preferred embodiment of the present invention, the lower hook(s) (30) is comprised of metal wire having a 0.125 inch diameter. FIG. 7 illustrates a cable(s) (50) being supported by the lower hook(s) (30).

Figure 13:
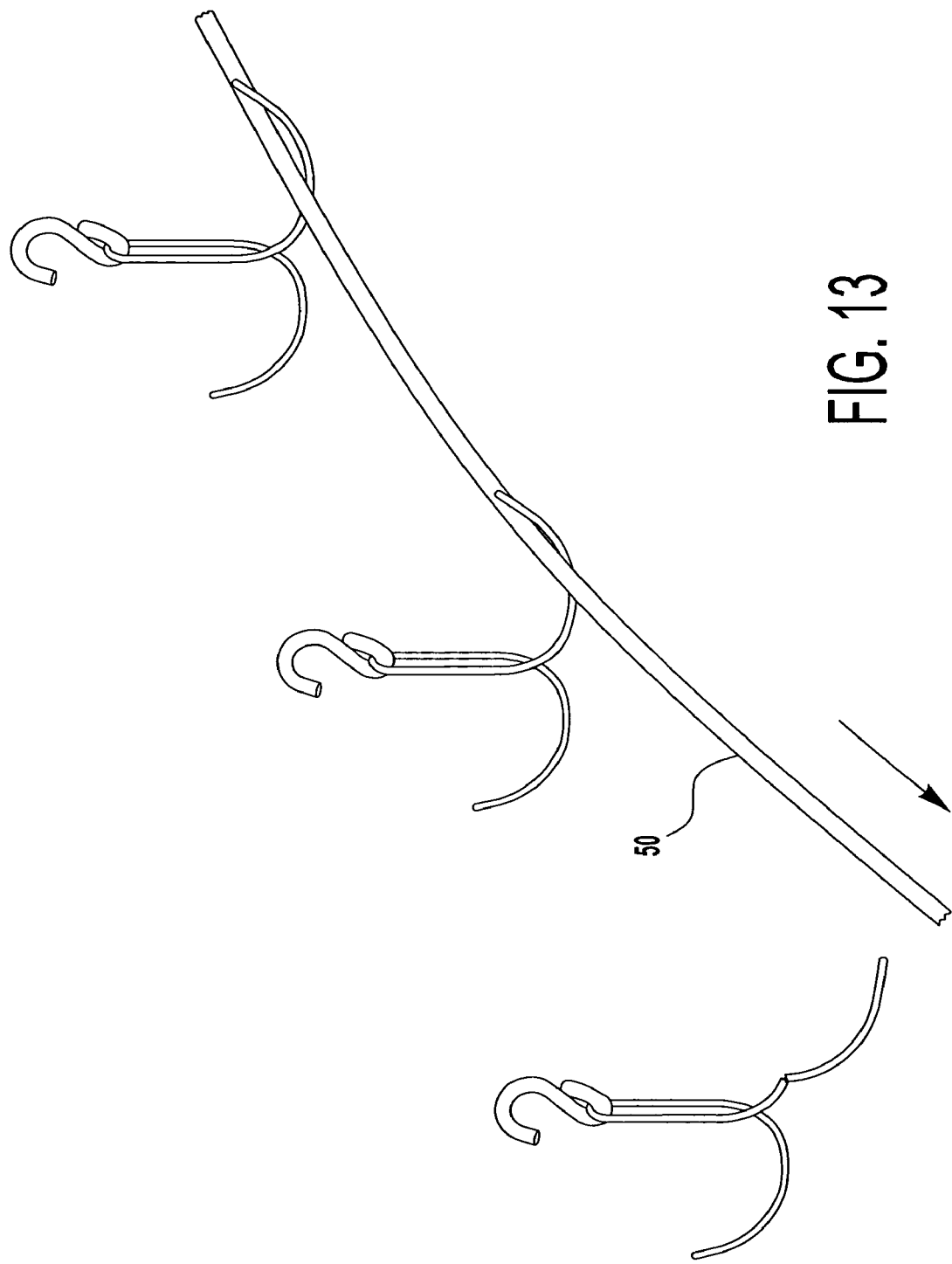
FIG. 13 illustrates an embodiment of the present invention in use, showing the Hangers breaking, collapsing and/or bending under tension from a mine cable being withdrawn.

Of significance to some embodiments of the present invention, each lower hook(s) (30) is designed to collapse under tension or pressure. (see FIG. 13). The arrow indicates the preferable direction of the tension on the cable. The word "collapse" is used herein to refer to any action that releases the cable (50), such as collapsing, bending, breaking, or separating from the remainder of the hanger (1). In a preferred embodiment of the present invention, each lower hook(s) (30) bends to release the cable (50) while staying securely attached to the rest of the hanger (1), which hanger (1) stays securely attached to the mine ceiling or a roof plate.

In a preferred embodiment of the present invention, the upper hook (10) is designed to remain in the roof while the lower hooks (30) are designed to bend under pressure and/or tension and to let the cable (50), or whatever cargo the lower hooks (30) are supporting, fall to the ground. It is possible to have other embodiments of the present invention, such as where the upper hook (10) bends and/or releases from the mine ceiling, thus, allowing the hanger (1) and the cable/cargo (50) to fall to the ground. In an alternative embodiment of the present invention, shown in FIGS. 8 and 9, the connecting member (20) can be designed to break or separate, thus releasing the lower hook(s) (30), the cargo and/or cable (and possibly a portion of or all of the connecting member (20)). In a preferred embodiment of the present invention, the hangers (1) are left in the mine ceiling after the cable (50) has been removed from them.

The collapsible hangers (1) of the present invention solve many of the problems faced by miners by releasing the cable (50) without the miners having to enter the Red Zone. Otherwise, the miners would have to enter the Red Zone to take the cable (50) down from the hangers and, thus, risk possible injury. In addition, a collapsible hanger (1) according to the present invention saves time by allowing for the continued extraction of coal without stopping production to manually remove the cable from the hangers and/or to remove the hangers from the released cable prior to winding the cable.

In a preferred embodiment of the present invention, the collapsible hanger (1) "breaks" or collapses/releases at each lower hook(s) (30), not higher than at the point where the lower hook(s) (30) meets the connecting member (20) and not at the upper hook (10). Additionally, in a preferred embodiment of the present invention, the collapsible hanger (1) remains in the ceiling after the cable is released. This embodiment allows the MRS to wind the cable up without the additional step of having someone remove and/or untangle the fallen hangers (1) from the fallen cables prior to the winding up process. These characteristics explain a preferred embodiment of the present invention, but should not be read to limit all embodiments of the present invention.

In certain embodiments of the present invention, the collapsible hanger (1) is comprised of two or more thicknesses of gauged wire. These gauges can be combined in any way, but experiments thus far indicate that the best results are obtained when a heavier gauge is used for the upper hook (10) and a lighter or lower gauge is used for the connecting member (20) and the lower hook(s) (30). In a preferred embodiment of the present invention, the gauges are chosen so that the lower hook(s) (30) collapse under a weight in the range of 50 to 100 pounds. In a preferred embodiment of the present invention, the upper hook (10) is comprised of 0.250 inch gauged wire and designed to stay in the roof plate (40) when the cable is released, the connecting member (20) is comprised of 0.125 to 0.312 inch diameter gauged wire, and the lower hook(s) (30) are comprised of 0.125 to 0.312 inch diameter gauged wire. The thickness of the lower hook(s) (30) varies according to the machine torque and diameter of the cables being used.

The preferred embodiments of the present invention have been found to provide very favorable results. The upper hook (10) fits into a roof plate (40) and the cable is supported on both sides of the hanger (1) in the lower hook(s) (30). The tension from the retraction of the cable, along with the weight of the cable, causes the lower hook(s) (30) to release the cable, by bending or breaking, thus lowering the miners' risk of being hit with cable, keeping the miners out of the Red Zone, eliminating the need to remove fallen hangers from the fallen cable, and allowing for the MRS to be moved and to continue further roof support.

Another embodiment of the present invention is characterized by a single lower hook (30) made to collapse under a weight in the range of 50 to 100 pounds (as shown in FIG. 1). The structure of this embodiment functions similar to other embodiments. The single lower hook (30) often represents that the miners are going in a different direction or signifies another pillar room. For example, along one mine corridor, hangers (1) having two lower hooks (30) may be used, with each lower hook (30) supporting a cable. At a particular location those two cables may go in different directions, down two different corridors or into different pillar rooms etc. When the cables separate, there is only one cable going in each direction so each cable may be supported by a hanger (1) having only one lower hook (30).

Figure 8:
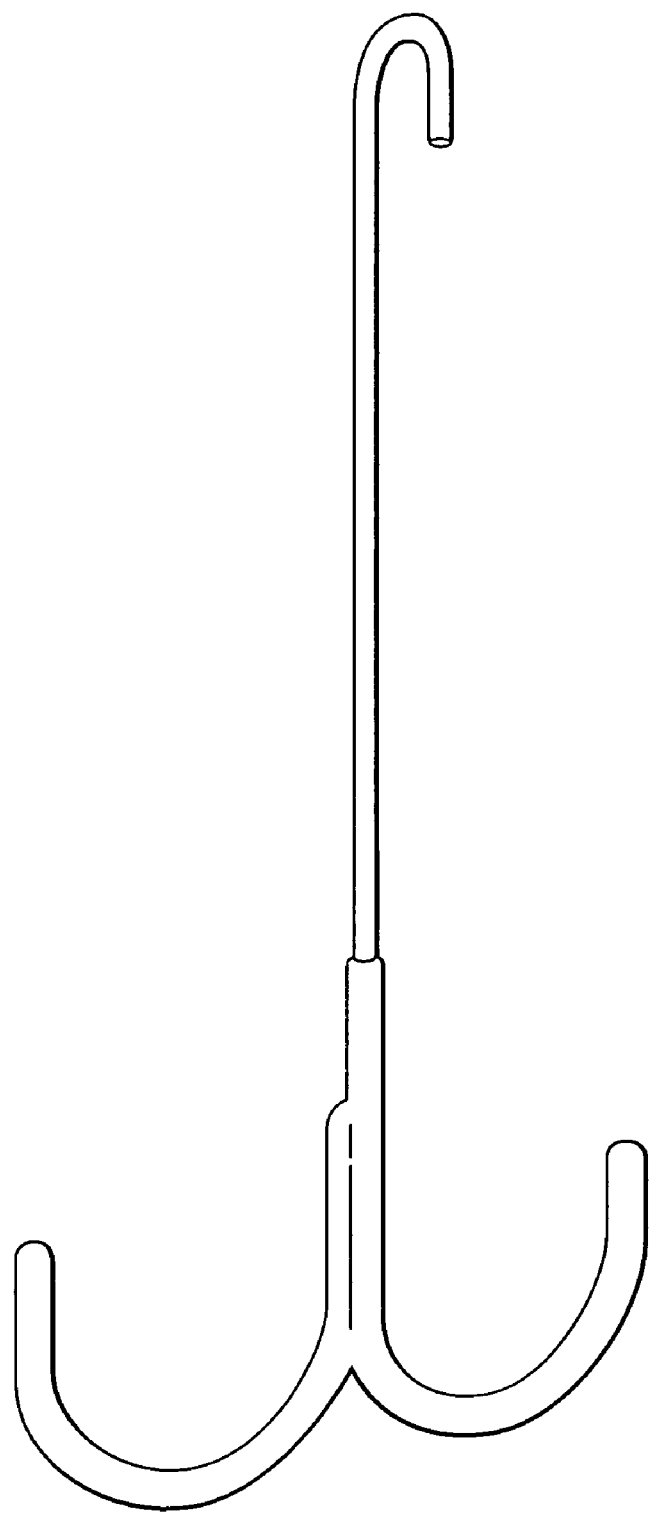
FIGS. 8 and 9 illustrate other embodiments of collapsible hangers.
Figure 9:
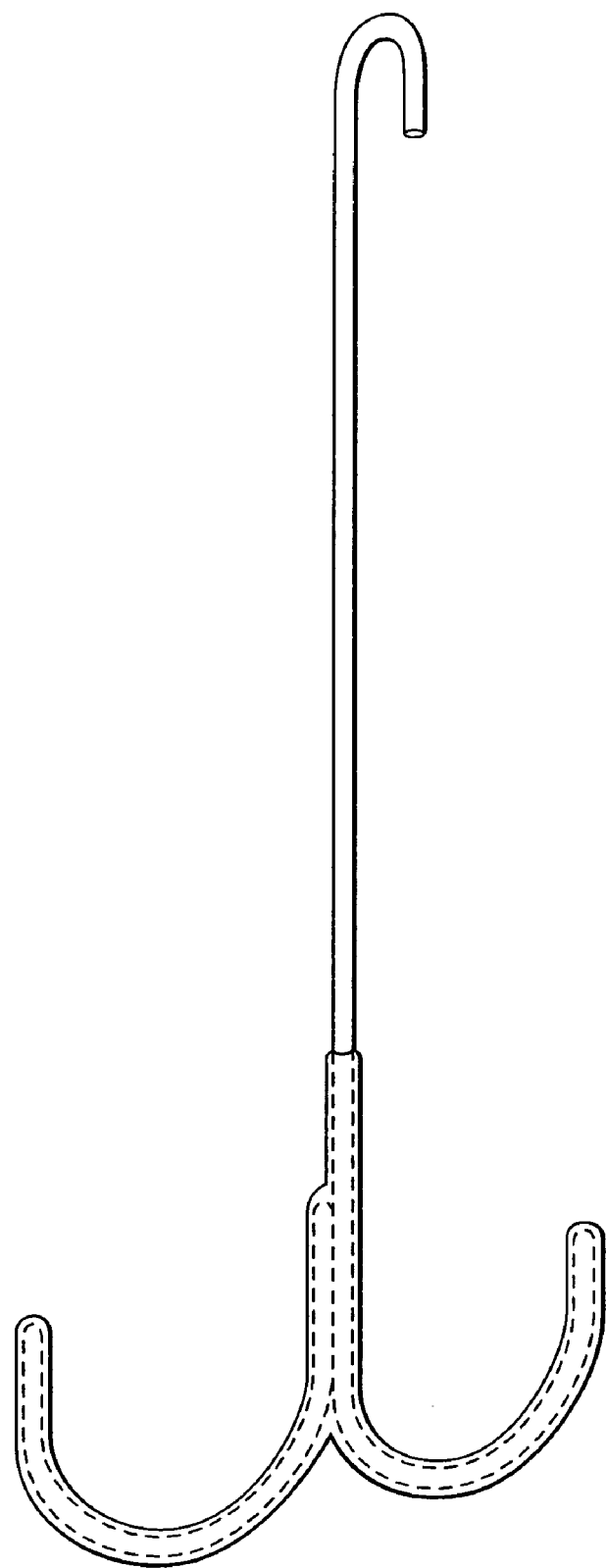

FIGS. 8 and 9 illustrate hangers that break at the upper hook (10) and/or connecting member (20) instead of at the lower hook(s) (30). These hangers (1) are encompassed by the present invention but are not a preferred embodiment because they do not address all of the safety issues that arise in the Red Zone. Specifically, they are not designed to release the cable, while remaining in the ceiling, and, as previously discussed, this defeats one of the purposes of having the hangers collapse.

In preferred embodiments of the present invention, the hangers (1) will be flame resistant and/or flame retardant, nonconductive, and have anti-static properties. Additionally, in preferred embodiments of the present invention, the hangers (1) will be a bright color, preferably yellow, orange, pink, green, red, or a combination thereof. Finally, in a preferred embodiment of the present invention, the hangers (1) are coated with the material Polyarmor G17® or coated with another polyethylene copolymer-based thermoplastic powder coating.

The hangers (1) of the present invention can be made of almost any material(s), so long as the construction of the hangers (1) allows them to satisfy the above-identified criteria. For example, the connecting member (20) may be made of metal, chain (as shown in FIG. 12), wire, cable, plastic, or rope. The entire hanger (1) may be comprised of galvanized or non-galvanized metal, wire, or metal wire.

Figure 10A:
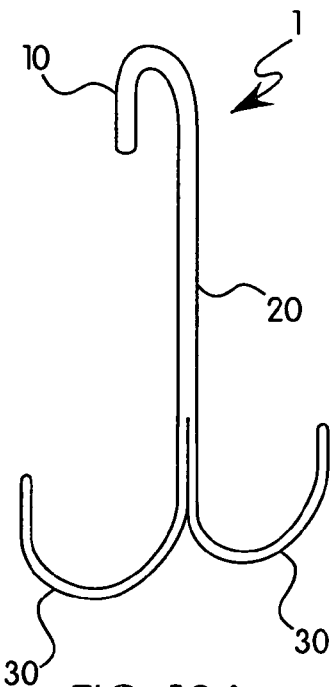
FIG. 10 illustrates four different embodiments of the present invention.
Figure 10B:
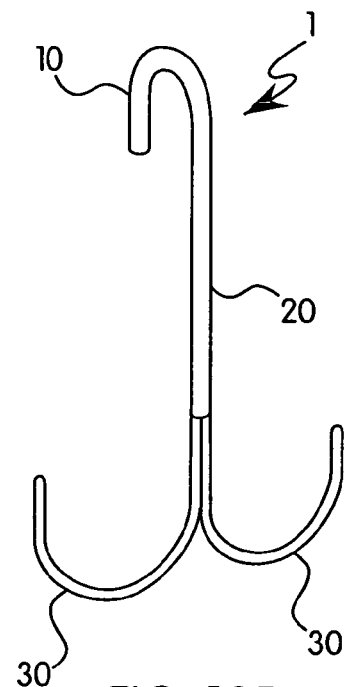
Figure 10C:
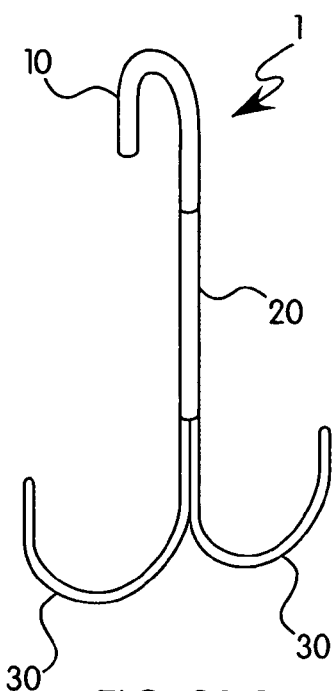
Figure 10D:
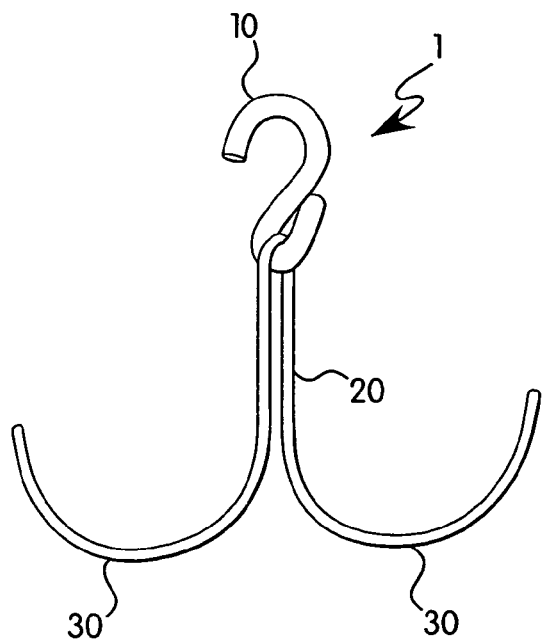

As shown in FIGS. 10A and 11, one embodiment of the present invention envisions the upper hook (10), the connecting member (20), and the lower hook(s) (30) formed out of a single piece of material. Alternatively, as shown in FIG. 10B, the upper hook (10) and the connecting member (20) may be made of one piece of material and the lower hook(s) (30) may be made of a separate piece of material. FIG. 10C illustrates an embodiment of the present invention wherein the upper hook (10), the lower hook(s) (30), and the connecting member (20) are each made from a separate piece of material. Finally, FIG. 10D shows an embodiment having the lower hook(s) (30) and the connecting member (20) formed from one piece of material and the upper hook (10) formed from a separate piece of material.

Similarly, the component parts of the present invention may have varying dimensions. In one embodiment of the present invention, the upper hook (10) is an "S" hook measuring 2.125 inches in length. In another embodiment of the present invention, the upper hook (10) is made of 0.250-inch diameter galvanized wire. In a further embodiment of the present invention, each lower hook(s) (30) is made of 0.125-inch diameter galvanized wire. Another embodiment of the present invention comprises a collapsible hanger (1), wherein the combined length of the connecting member (20) and the one lower hook(s) (30), from the uppermost end of the connecting member (20) to the lowermost end of the lower hook(s) (30) is 3.125 inches. In yet another embodiment of the present invention, the collapsible hanger (1) has one or more lower hooks (30) comprised of wire having a gauge in the range of 0.091 to 0.187 inches.

Figure 11A:
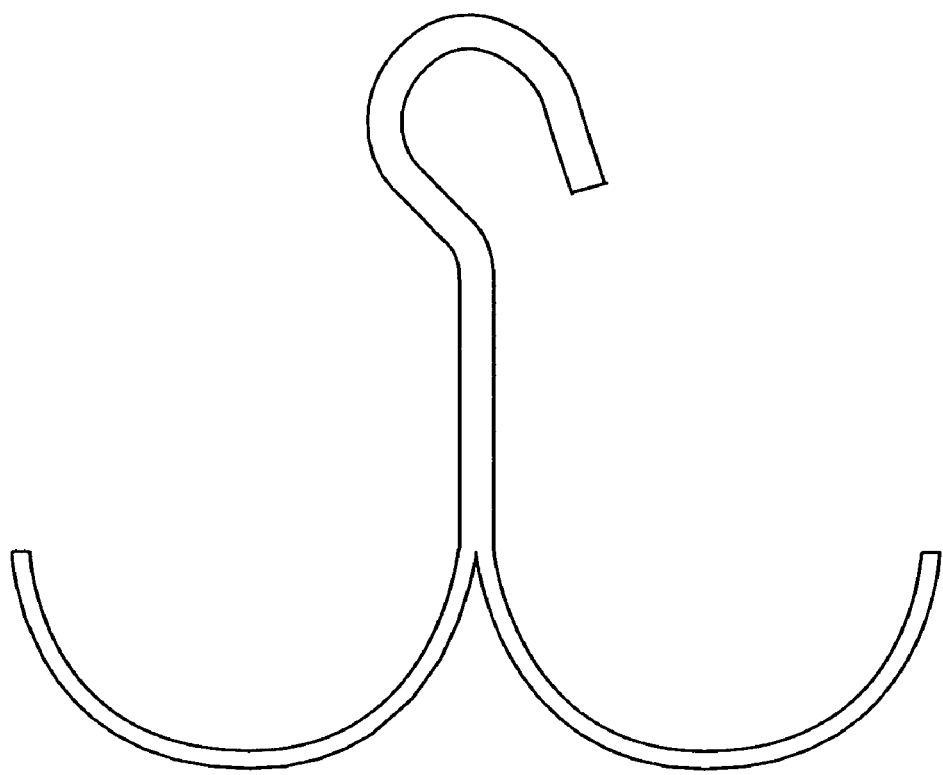
Figure 11B:

Finally, FIGS. 11A through 12C illustrate two possible embodiments of the present invention having specific dimensions. FIGS. 11A and 11B illustrate one embodiment of the present invention collapsible hanger from a front view and from a side view. This embodiment has all component parts made from one piece of wire. The length of the hanger (1), from the top of the upper hook (10) to the lowest part of each lower hook (30) measures 5.536 inches. The upper hook (10) has a diameter of 0.250 inches if 0.312 to 0.260 inch diameter wire is used. If the hanger (1) is made from wire originally measuring 0.312 to 0.250 inches in diameter, then the wire is cut in half to form the lower hooks (30). The distance between the connecting member (20) and the end of each lower hook (30) is 3 inches, making the radius of a circle formed by the connecting member (20) and each lower hook (30) 1.5 inches.

FIGS. 12A through 12C illustrate a further embodiment of the present invention wherein the connecting member (20) is comprised of chain. In that embodiment, the wire of the upper hook (10) is 0.207 to 0.256 inches in diameter. The length of the lower hooks (30) from the point where the lower hooks (30) connect to the chain to the lowest point of each lower hook (30) is 3.125 inches. The length of the "S" hook that forms the upper hook (10) is 2.125 inches. The radius of the upper part of the upper hook (10) is 0.437 inches and the radius of the lower part of the upper hook is 0.125 inches. The radius of the wire of the lower hooks (30) at the point where it connects to the chain is 0.1875 inches. The distance between the connecting member (20) and the end of each lower hook (30) is 3 inches, making the radius of a circle formed by the connecting member (20) and each lower hook (30) 1.5 inches.

The present invention also encompasses various methods of working with cables in mines comprised of installing a collapsible hanger according to any of the above-identified embodiments. In one embodiment of the present invention, such a method of working with cables in a mine comprises installing a collapsible hanger comprised of: (i) an upper hook; (ii) at least one lower hook; and (iii) a connecting member, which connects the upper hook to the lower hook(s), wherein the lower hook(s) is constructed such that when tension is applied to a cable supported by the lower hook(s), the hanger releases the cable. In a further embodiment of the present invention, this method also comprises releasing the cable from the hanger, which may be done by applying tension to the cable. Additionally, in one embodiment of the present invention, the cable is wound up after it is released from the hangers. Finally, in another embodiment of the present invention, the hangers may be left in the ceiling of the mine after the cable is released. These methods may utilize any and all of the embodiments of the collapsible hanger described herein.

The above-provided discussion of various embodiments of the present invention is intended to be an illustrative, but not exhaustive, list of possible embodiments. It will be obvious to one skilled in the art that other embodiments are possible and are included within the scope of this invention.

What is claimed is:

1. A hanger for carrying an overhead cable used in a mine, the hanger designed to intentionally break and release the cable from the hanger with remote retraction of the cable from the mine, the hanger comprising:

an upper hook that securely hangs from a ceiling of the mine;

at least one lower hook that carries and supports the cable; and a connecting member, which connects the upper hook to the at least one lower hook; wherein the at least one lower hook and the connecting member have a gauge that is less than the gauge size of the upper hook and wherein the at least one lower hook has a lower gauge size than the gauge size of the connecting member;

such that the lower hook and the connecting member have strength and composition sufficient to support the cable in normal use, but which, when tension or pressure is applied to the lower hook by remote retraction of the cable from the mine, break to release the cable and facilitate safe removal of the cable from the mine.

2. The hanger of claim 1, wherein the at least one lower hook is not fixedly secured to the upper hook before the tension or pressure is applied by remote retraction of the cable.

3. The hanger of claim 1, wherein said at least one lower hook and said connecting member are manufactured from a single piece of material.

4. The hanger of claim 3, wherein said single piece of material is a galvanized metal.

5. The hanger of claim 1, which is manufactured from multiple pieces of material.

6. The hanger of claim 1, wherein said upper hook and said connecting member are made from a single piece of material.

7. The hanger of claim 1, wherein said upper hook, said at least one lower hook, and said connecting member are at least one bright color.

8. The hanger of claim 7, wherein said bright color is selected from the group consisting of pink, yellow, orange, red, and green.

9. The hanger of claim 1, wherein said upper hook remains hanging from the mine ceiling when said tension or pressure is applied to said cable.

10. The hanger of claim 1, wherein said connecting member is comprised of a material selected from the group consisting of metal, chain, wire, cable, plastic, and rope.

11. The hanger of claim 1, wherein the upper hook comprises an "S" hook, one end of which is attached to the connecting member.

12. The hanger of claim 11, wherein the "S" hook is about 2.125 inches in length.

13. The hanger of claim 1, wherein the upper hook, the at least one lower hook, and the connecting member are comprised of metal wire.

14. The hanger of claim 13, wherein the wire is galvanized.

15. The hanger of claim 1, wherein the upper hook comprises metal wire that measures from about 0.207 to 0.250 inches in diameter.

16. The hanger of claim 1, wherein the at least one lower hook is comprised of about 0.125 inch diameter metal wire.

17. The hanger of claim 1, wherein:
the material is a metal wire; and
the combined length of the connecting member and the at least one lower hook, from an uppermost end of the connecting member to the lowermost end of the at least one lower hook is about 3.125 inches.

18. The hanger of claim 1, wherein the hanger is coated with a polyethylene copolymer-based thermoplastic powder coating.

19. The hanger of claim 1, wherein the at least one lower hook is comprised of wire having a diameter in the range of about 0.091 to 0.187 inches.

20. The hanger of claim 1 which is made of a substantially flame-retardant material.

21. The hanger of claim 1 which has anti-static properties.

22. The hanger of claim 1 which is substantially nonconductive.

23. The hanger of claim 1 which is comprised of two or more thicknesses of gauged wire.

24. The hanger of claim 1, wherein:
said upper hook comprises a 0.250 inch diameter metal wire and remains hanging from the mine ceiling when said cable is released;
said connecting member is comprised of metal wire having a diameter of 0.125 to 0.312 inches; and
said at least one lower hook is comprised of metal wire having a diameter of 0.125 to 0.312 inches.

25. The hanger of claim 1, wherein said connecting member is comprised of wire that is cut to form two lower hooks.

26. The hanger of claim 1, wherein the diameter of said at least one lower hook does not exceed the diameter of said connecting member.

27. The hanger of claim 1, wherein the at least one lower hook breaks under a weight in the range of 50 to 100 pounds.

28. The hanger of claim 1, wherein the length of the hanger, from the top of the upper hook to the lowest part of each of the at least one lower hooks measures about 5.536 inches in length.

29. The collapsible hanger of claim 1, wherein:
said upper hook comprises an "S" hook of metal wire having a diameter in the range of 0.207 to 0.256 inches;
the length from the point where said at least one lower hook connects to said connecting member to the lowest point of said at least one lower hook is 3.125 inches;
the radius of said upper hook is in the range of 0.125 to 0.437 inches;
the length of said "S" hook is 2.125 inches;
the radius of said at least one lower hook at the point where said at least one lower hook connects to said connecting member is 0.1875 inches; and
the distance between said connecting member and the end of each of said at least one lower hook is 3 inches, making the radius of a circle formed by said connecting member and each of said at least one lower hook 1.5 inches.

30. A hanger for releasably carrying overhead cable used in a mine, the hanger designed to purposefully bend or break and release the overhead cable, the hanger comprising:
an upper hook that securely hangs down from a ceiling of the mine;
at least one lower hook that carries and supports the cable;
a connecting member, which connects the upper hook to the at least one lower hook; and,
wherein the at least one lower hook and the connecting member are manufactured from a single piece of material;
wherein the at least one lower hook has a strength and composition sufficient to the cable in normal use, but which, when tension or pressure of at least about 50 pounds is applied by remote retraction of the cable from the mine, the lower hook of the hanger will intentionally break, under a weight in the range of 50 to 100 pounds, to release the cable to facilitate removal of the cable from the mine.

31. The hanger of claim 30, wherein said upper hook, said at least one lower hook, and said connecting member are manufactured from a single piece of material.

32. The hanger of claim 30, wherein said single piece of material is a galvanized metal.

33. The hanger of claim 30, wherein the at least one lower hook and the connecting member are manufactured from a single piece of material.

34. The hanger of claim 30, wherein said upper hook and said connecting member are made from a single piece of material.

35. The hanger of claim 30, wherein said upper hook, said at least one lower hook, and said connecting member are at least one bright color.

36. The hanger of claim 35, wherein said bright color is selected from the group consisting of pink, yellow, orange, red, and green.

37. The hanger of claim 30, wherein said upper hook remains hanging from the mine ceiling when said tension is applied to said cable.

38. The hanger of claim 30, wherein the connecting member is comprised of a material selected from the group consisting of metal, chain, wire, cable, plastic, and rope.

39. The hanger of claim 30, wherein the upper hook comprises an "S" hook, one end of which is attached to the connecting member.

40. The hanger of claim 30, wherein the upper hook, the at least one lower hook, and the connecting member are comprised of metal wire.

41. The hanger of claim 40, wherein the wire is galvanized.

42. The hanger of claim 30, wherein said hanger is coated with a polyethylene copolymer-based thermoplastic powder coating.

43. The hanger of claim 30, wherein said hanger is flame-retardant.

44. The hanger of claim 30, wherein said hanger has anti-static properties.

45. The hanger of claim 30, wherein said hanger is non-conductive.

46. The hanger of claim 30 which is comprised of two or more thicknesses of gauged wire.

47. The collapsible hanger of claim 30, wherein:
said upper hook comprises a 0.250 inch diameter metal wire and remains hanging from the mine ceiling when said cable is released;
said connecting member is comprised of metal wire having a diameter of 0.125 to 0.312 inches; and
said at least one lower hook is comprised of metal wire having a diameter of 0.125 to 0.312 inches.

48. The hanger of claim 30, wherein said connecting member is comprised of cut wire that forms multiple lower hooks.

49. The hanger of claim 30, wherein the diameter of said at least one lower hook does not exceed the diameter of said connecting member.

50. The collapsible hanger of claim 30, wherein:
said upper hook comprises an "S" hook of metal wire having a diameter in the range of 0.207 to 0.256 inches;
the length from the point where said at least one lower hook connects to said connecting member to the lowest point of said at least one lower hook is 3.125 inches;
the radius of said upper hook is in the range of 0.125 to 0.437 inches;
the length of said "S" hook is 2.125 inches;
the radius of said at least one lower hook at the point where said at least one lower hook connects to said connecting member is 0.1875 inches; and
the distance between said connecting member and the end of each of said at least one lower hook is 3 inches, making the radius of a circle formed by said connecting member and each of said at least one lower hook 1.5 inches.

51. A breakable hanger for carrying an overhead cable until the hanger breaks with an intentionally applied tension or pressure of at least 50 pounds for facilitating cable removal, the breakable hanger comprising:
an upper hook that securely attaches to and hangs down from an overhead structure;
at least one lower cable-carrying hook; and
a connecting member, wherein the at least one lower hook has a lower gauge size than the gauge size of the connecting member which connects the upper hook to the at least one lower hook until the tension or pressure is intentionally applied to cause the hanger to break and facilitate cable removal.

52. The collapsible breakable hanger of claim 51, wherein the at least one lower hook breaks under a weight of up to about 100 pounds.

53. A breakable hanger for carrying overhead cable in a mine, the breakable hanger comprising:
an upper hook that securely hangs down from a ceiling of the mine;
a lower hook that carries and supports the cable near the mine ceiling when in normal use; and
a connecting member, which connects the upper hook to the lower hook; wherein the at least one lower hook has a lower gauge size than the gauge size of the connecting member and, wherein the at least one lower hook and the connecting member has a weight-bearing capacity less than the weight-bearing capacity of the upper hook and also have a strength and composition sufficient to support the cable in normal use, but which, when tension or pressure is applied by remote retraction of the cable from the mine, after which the lower hook or the connecting member intentionally breaks to release the cable and facilitate its safe removal from the mine.

54. The collapsible breakable hanger of claim 53, wherein the upper hook hangs from a roof plate attached to the mine ceiling.

* * * * *

UNITED STATES PATENT AND TRADEMARK OFFICE
CERTIFICATE OF CORRECTION

PATENT NO.         : 7,757,996 B2
APPLICATION NO.    : 11/026593
DATED              : July 20, 2010
INVENTOR(S)        : William Jacobs It is certified that error appears in the above-identified patent and that said Letters Patent is hereby corrected as shown below:

1. Claim 30, line 2, "bend or" should be deleted between "purposefully" and "break" and should read --purposefully break--.
2. Claim 30, line 13, --support-- should be inserted between "to" and "the" and should read --to support the--.
3. Claim 47, line 1, "collapsible" should be deleted and should read --The hanger--.
4. Claim 50, line 1, "collapsible" should be deleted and should read --The hanger--.
5. Claim 52, line 1, "collapsible" should be deleted and should read --The breakable--.
6. Claim 54, line 1, "collapsible" should be deleted and should read --The breakable--.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,757,996 B2
APPLICATION NO. : 11/026593
DATED : July 20, 2010
INVENTOR(S) : William Jacobs Page 1 of 1

It is certified that error appears in the above-identified patent and that said Letters Patent is hereby corrected as shown below:

1. Column 8, line 45 (Claim 30, line 2), "bend or" should be deleted between "purposefully" and "break" and should read --purposefully break--.
2. Column 8, line 56 (Claim 30, line 13), --support-- should be inserted between "to" and "the" and should read --to support the--.
3. Column 9, line 37 (Claim 47, line 1), "collapsible" should be deleted and should read --The hanger--.
4. Column 9, line 50 (Claim 50, line 1), "collapsible" should be deleted and should read --The hanger--.
5. Column 10, line 28 (Claim 52, line 1), "collapsible" should be deleted and should read --The breakable--.
6. Column 10, line 49 (Claim 54, line 1), "collapsible" should be deleted and should read --The breakable--.

This certificate supersedes the Certificate of Correction issued November 9, 2010.

Signed and Sealed this

Fourteenth Day of December, 2010

David J. Kappos
*Director of the United States Patent and Trademark Office*